(12) United States Patent
Bregulla et al.

(10) Patent No.: US 7,774,167 B2
(45) Date of Patent: Aug. 10, 2010

(54) SYSTEM AND METHOD FOR PROVIDING DIAGNOSIS INFORMATION

(75) Inventors: Markus Bregulla, Ingolstadt (DE); Ralph Buesgen, Duluth, GA (US); Clemens Dinges, Obermichelbach (DE); Joachim Feld, Nürnberg (DE); Daniel Großmann, München (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/570,003

(22) PCT Filed: Aug. 24, 2004

(86) PCT No.: PCT/EP2004/009445
§ 371 (c)(1),
(2), (4) Date: Feb. 28, 2006

(87) PCT Pub. No.: WO2005/036290

PCT Pub. Date: Apr. 21, 2005

(65) Prior Publication Data
US 2006/0259243 A1    Nov. 16, 2006

(30) Foreign Application Priority Data
Sep. 19, 2003   (DE)  .................. 103 43 963

(51) Int. Cl.
*G06F 11/30* (2006.01)
*G05B 19/18* (2006.01)
(52) U.S. Cl. .................. 702/183; 714/25; 700/3
(58) Field of Classification Search ......... 702/182–185, 702/59, 81, 84, 188, 189; 714/30, 37, 25, 714/31, 47, 48; 715/517, 788; 700/3, 9, 700/26, 108–110; 706/10, 20–30, 903, 904
See application file for complete search history.

(56) References Cited

U.S. PATENT DOCUMENTS

| | | | |
|---|---|---|---|
| 5,625,574 A * | 4/1997 | Griffiths et al. | 702/183 |
| 6,108,616 A * | 8/2000 | Borchers et al. | 702/183 |
| 6,606,580 B1 * | 8/2003 | Zedda et al. | 702/185 |
| 6,615,090 B1 | 9/2003 | Blevins et al. | |
| 6,910,156 B2 | 6/2005 | Adam | |
| 2003/0014229 A1 | 1/2003 | Borth et al. | |
| 2005/0015398 A1 | 1/2005 | Schlereth et al. | |

FOREIGN PATENT DOCUMENTS

| | | |
|---|---|---|
| DE | 197 42 448 C1 | 12/1998 |
| DE | 100 08 020 A1 | 8/2002 |
| DE | 101 333 375 A1 | 1/2003 |
| EP | 0 242 609 | 10/1987 |
| EP | 0 810 557 A2 | 12/1997 |
| EP | 0 893 746 A2 | 1/1999 |
| WO | WO 96/20439 A1 | 7/1996 |
| WO | WO 01/09694 A1 | 2/2001 |
| WO | WO 03/040842 A1 | 5/2003 |

\* cited by examiner

*Primary Examiner*—Michael P Nghiem
*Assistant Examiner*—Toan M Le

(57) ABSTRACT

The invention relates to a method for generating a system for providing diagnosis information, and to a corresponding system. The aim of the invention is to simplify the provision of information for diagnosing technical installations or technical processes. To this end, components pertaining to an automation system and having diagnosis interfaces for providing diagnosis information for diagnosing the respective components are collected in at least one group, and the diagnosis information of the respective group is provided by combining the diagnosis information of the components collected in the respective group.

13 Claims, 7 Drawing Sheets

FIG 4

```xml
-<SCRIPT>
  -<STEP NR="0">
    -<TARGET ID="4">
      + <FUNCTION SCRIPT="0" NAME="ROLLTOR_IST_AUF" ALIAS="" VALUE="0" TYPE="">
      + <FUNCTION SCRIPT="0" NAME="ROLLTOR_IST_ZU" ALIAS="" VALUE="0" TYPE="">
    </TARGET>
    -<CONDITION PARAM="0.4.ROLLTOR_IST_AUF.OUT.ROLLTOR_IST_AUF" OP="=" VALUE="1">
      -<TRUE>
        -<CONDITION PARAM="0.4.ROLLTOR_IST_ZU.OUT.ROLLTOR_IST_ZU" OP="=" VALUE="1">
          -<TRUE>
            -<RETURN>
              -<VAR NAME="ERROR" VALUE="">
                <VAR NAME="ID" VALUE="4" />
                <VAR NAME="DESC" VALUE="ERROR ROLLTOR1: ROLLTOR_IST_AUF=ROLLTOR_IST_ZU" />
              </VAR>
            </RETURN>
          </TRUE>
          <FALSE />
        </CONDITION>
      </TRUE>
      <FALSE />
    </CONDITION>
  </STEP>
</SCRIPT>
```

SYSTEM AND METHOD FOR PROVIDING DIAGNOSIS INFORMATION

CROSS REFERENCE TO RELATED APPLICATIONS

This application claims priority to the German application No. 10343963.3, filed Sep. 19, 2003 and to the International Application No. PCT/EP2004/009445, filed Aug. 24, 2004 which are incorporated by reference herein in their entirety.

FIELD OF INVENTION

The invention relates to a method for generation of a system for provision of diagnosis information and to a corresponding system.

BACKGROUND OF INVENTION

DE 100 08 020 A1 describes a diagnosis device in a process control system which uses multi-variable control techniques, with a diagnosis tool automatically recording and storing data which specifies a control parameter, a mode parameter, a status parameter and a limit value parameter which belong to each of the different devices, groups or functional blocks within a process control system in order to determine which devices, groups or functional blocks have problems which lead to a reduced performance of the process control system, displaying a list of the recorded problems to an operator and subsequently suggesting the use of further more specific diagnosis tools to further pinpoint the problems or to correct them.

SUMMARY OF INVENTION

An object of the invention is to simplify the provision of information for diagnosis of technical installations or technical processes.

This object is achieved by a method for generation of a systems for provision of diagnosis information, said method collecting into at least one group components of an automation system which feature diagnosis interfaces for provision of diagnosis information for diagnosis of the relevant components and the provision of diagnosis information of the relevant group is undertaken by logical combination of the diagnosis information of the components collected in the relevant group.

This object is achieved by a system for provision of diagnosis information, with components of an automation system, which feature diagnosis interfaces for provision of diagnosis information for diagnosis of the relevant component collected into at least one group, with means being provided for the provision of diagnosis information of the relevant group by logical combination of the diagnosis information of the components collected in the respective group.

The invention is based on the knowledge that the proportion of distributed, component-based automation systems is increasing and that thus there is a need to be able to diagnose these systems when faults occur. The diagnosis should not be limited just to single automation components in such cases but must make it possible to enable the entire automation system or its subsystems to be investigated and where possible to do this with a uniform, end-to-end operating paradigm. The engineering outlay involved in creating a system-wide diagnosis for a distributed automation system is usually very high, also conditional on the fact that the diagnostic system has previously had to be created specifically for a specific installation. The diagnosis of distributed automation solutions has up to now been aimed as a rule at the diagnosis of individual components (e.g. the diagnosis software is supplied together with the relevant hardware component) or can only be established through expensive project planning for the relevant installation. This project planning is usually created manually by automation specialists with reference to the installation layout (paper printout) and the functional description of the installation. Thus the diagnosis of a component (diagnosis tool is supplied by the component manufacturer) has differed from the diagnosis of the installation (is supplied by the installation manufacturer). The invention makes possible both a component-based diagnosis and also simultaneously a diagnosis of groups comprising components. A group will also be referred to below as a subsystem or diagnosis subsystem. The diagnosis information of the groups can be supplied in such cases by logical linkage of the diagnosis information of the components collected in the respective group. This especially provides the opportunity to generate the system for provision of diagnosis information or to provide the diagnosis information automatically. The engineering outlay for creating a diagnosis system is significantly reduced in this way.

As described, the invention provides an access path to component diagnosis. On the other hand the invention also offers the option of installation diagnosis, with on the one hand the [;ant diagnosis starting at a higher level of abstract ion than the component diagnosis, but on the other hand building on component diagnosis. In accordance with an advantageous embodiment of the invention, subordinate groups or subordinate groups and components are collected into at least one higher-ranking group, with the generation of diagnosis information of the relevant higher-ranking group being provided by logically combining the diagnosis information of the groups or components collected in the respective higher-ranking group. At the highest level of the diagnosis hierarchy thus produced stands the diagnosis system of the installation or of the process, which is thus made up of groups or diagnosis subsystems, with these diagnosis subsystems able to contain further diagnosis subsystems. A self-similar, a fractal system is produced. The fractality in particular includes the fact that the installation description, like the component description, is based on the same interfaces and can thereby be processed directly by existing diagnosis tools developed for component diagnosis or by further developments of such tools. This enables a uniform, end-to-end operation, a reduction of the costs for installation diagnosis tool development and further development.

It is advantageous if the interfaces of the automation components are described in a standardized manner, by a specification of PROFInet Webintegration for example. The standardized interfaces of the components, which also include diagnosis functionality, enable a control system to create a complete diagnosis system for one group of components in each case through logical combination with the layout information. In this case the diagnosis function of a subsystem is based on the standardized diagnosis functions of the automation components that it contains.

In accordance with a further advantageous embodiment of the invention the components are elements of an installation layout and the diagnosis information is logically combined as a function of information contained in the installation layout. One object of the system diagnose is the detection of errors which arise from the interaction of the components of the installation. The installation manufacturer defines the interaction of the components through the layout planning of the installation. The proposed embodiment of the invention makes it possible to derive an installation diagnosis from the digital installation layout created during the installation planning phase by generating it automatically. In addition to shortening the engineering times, this also leads to a reduction in the probability of errors during creation of the diagnosis system. A novel method is thus proposed which makes it possible to automatically derive from layout information a diagnosis system, especially for a distributed automation system including its components, with this system having the attribute of fractality as regards its diagnosis functions.

The installation components are collected in the installation layout into logically associated groups, known as diagnosis subsystems This process can for example correspond to the determination of the technological hierarchy often to be defined in the planning phase. In this case a specific definition of a hierarchy of diagnosis subsystems based on the layout is omitted. Ex ante however the diagnosis subsystems do not have to cover the same areas as the elements of the technological hierarchy required for operational control (subsystems, units, . . . ), in particular entirely different aspects, e.g. locality, can determine the structuring of the diagnosis hierarchy. These diagnosis subsystems encapsulate the automation components contained within them and thus reduce the complexity of the diagnosis of the overall system. In accordance with a further advantageous embodiment of the invention, tasks and networking of the components are also specified by the installation layout.

Advantageously the membership of the groups in higher-ranking groups, i.e. of diagnosis subsystems in the next higher hierarchy level, can also be defined in the installation layout. This corresponds to the collection of the associated diagnosis subsystems into an encapsulating diagnosis subsystem at a higher level.

In accordance with a further advantageous embodiment of the invention the diagnosis information is structured in a semantically similar manner. On the basis of the diagnosis hierarchy defined in the installation layout a semantically similar diagnosis function can be generated automatically for all elements of the hierarchy. This is based on the following principle: The generated diagnosis function of a component checks its own status when called. Depending on the result, the diagnosis function reports an error including description. At the level of the next-highest level the generated diagnosis function of a subsystem for example checks its own status and calls the diagnosis function of the associated component. Depending on the values obtained, the diagnosis function reports an error with description if necessary. This means that the purely logical diagnosis subsystems also possess a diagnosis function. This principle is applied recursively up to the highest level, i.e. the diagnosis function of the diagnosis subsystem is characterized so that it calls the diagnosis functions of the directly subordinate subsystems in each case. In addition to this propagation of diagnosis function calls from a higher level down to the respective subordinate level of the diagnosis hierarchy, higher-value diagnosis functionality can be generated automatically in the sense of induction by including the installation logic.

Advantageously the diagnosis information includes functions which combine input variables—especially logically combining them—and provide at least one output variable as a result of the logical combination of the input variables. The applicable installation or system logic can be subdivided in this case into two categories. "Single Level Logic" maps the logic of an element of the diagnosis hierarchy. In this case internal information of the element concerned is logically combined. "Multi Level Logic" maps the logic of a subsystem, building on the subordinate elements "contained within it". For recursive generation of the diagnosis functions (these are for example characterized as a script) the rules are then incorporated into the characterization of the diagnosis functions. In the case of single level logic the defined roles are accepted directly into the diagnosis function. In the case of multi-level logic, the rule to be used in the given case is determined on the basis of the installation layout, since multi-level logic arises from the interaction between different components. Diagnosis information is thus generated by recursive application of a system of rules which logically combines standardized diagnosis interfaces with layout information.

Consistency rules ("constraints") can be defined for both categories or can already be present as type attribute of the components or also the subsystem classes used. These rules are generally already present when the invention is used as part of a component (e.g. as what is referred to as a facet) or diagnosis subsystems (e.g. for re-use of the planning information of parts of older installations). In accordance with a further advantageous embodiment of the invention classes are assigned to the components and the groups which define functions and properties of the relevant component or group. The definition of device classes (relative to components and subsystems) with defined functions and properties can be the basis for the creation of single-level and multi-level logic. By using the inherent rules or rules building on them and by including the installation layout, diagnosis functionality can be derived and generated automatically, as outlined above. The rules can be applied recursively because of the fractality and thus, starting from smaller component groups, a diagnosis system can be built up for the entire installation.

The invention can advantageously be used to supply diagnosis information in a distributed, component-based automation system. Thus a method is proposed in particular for the automatic generation of a function-fractal installation diagnosis system for a distributed, component-based automation system from layout information.

If, in accordance with a further advantageous embodiment of the invention, the components are PROFInet components, the automation functionality is produced by what are known as RT-Autos, so that diagnosis subsystems at the lowest level encapsulate the associated RT-Autos.

Advantageously means are provided for the visualization of the diagnosis information on the basis of the installation layout. It is proposed that the inventive system be used for the diagnosis of a technical installation or a technical process.

BRIEF DESCRIPTION OF THE DRAWINGS

The invention is described and explained in more detail below on the basis of the exemplary embodiments shown in the figures.

The figures show:

FIG. 4 a diagnosis script function,

DETAILED DESCRIPTION OF INVENTION

Figure 1:
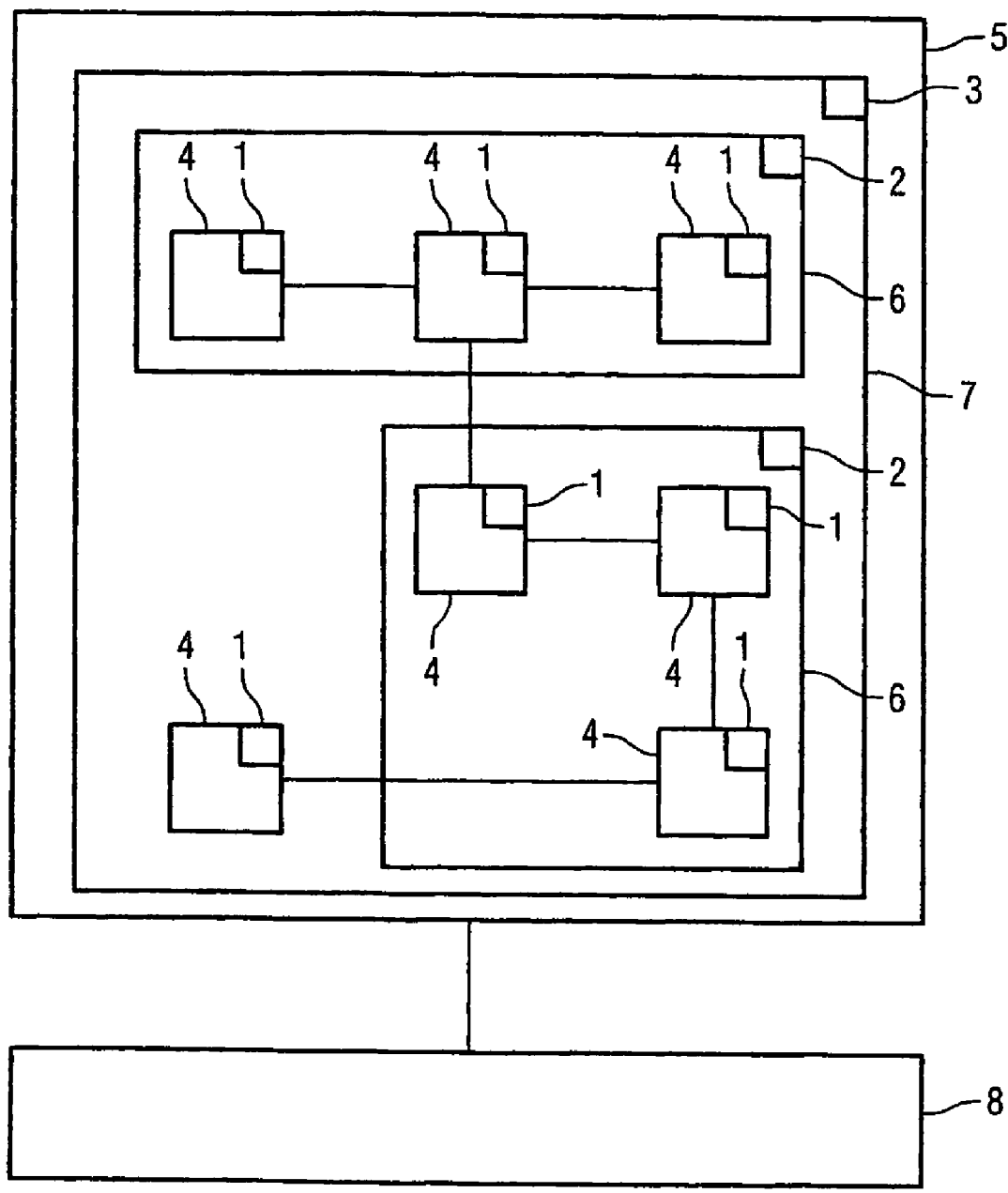
FIG. 1 a system for provision of diagnosis information.

FIG. 1 shows a system for provision of diagnosis information. An automation system 5 features components 4 which feature diagnosis interfaces for providing diagnosis information for diagnosis of the relevant component 4. The components 4 are divided into two groups 6 in the example shown. The system features means for provision of diagnosis information 2 of the relevant group 6 by logically combining the diagnosis information 1 of the components 4 collected into the relevant group 6. The two groups 6 and a further component 4 are collected into a higher-ranking group 7. Diagnosis information 3 of the higher-ranking group 7 is generated by logically combining the diagnosis information 1, 2 of the groups 6 or components 4 collected in the higher ranking group 7. The system is used in the example shown for diagnosis of a technical process 8. The automation system 5 is used for automation of the technical process 8.

Figure 2:
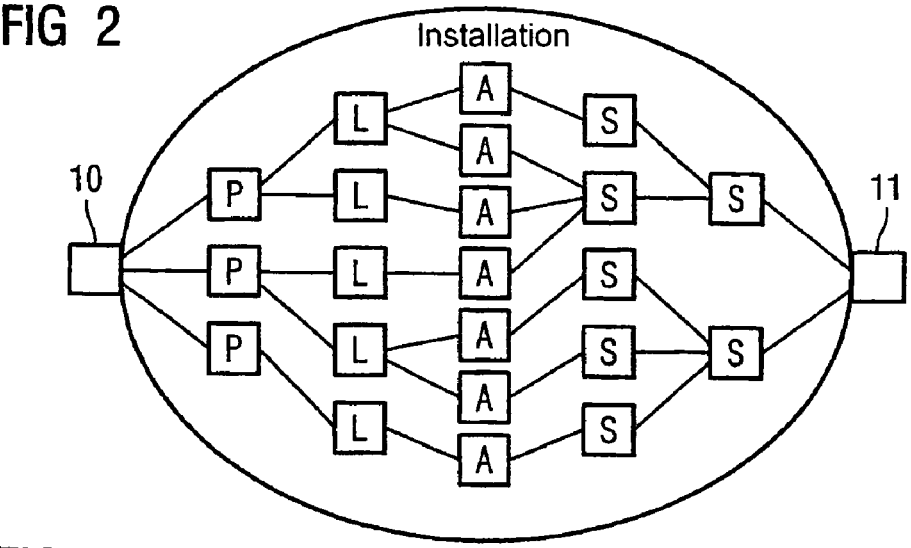
FIG. 2 a logical diagnosis hierarchy derived from the installation layout.

FIG. 2 shows a logical diagnosis hierarchy derived from the installation layout using PROFInet as an example (see below for a more detailed explanation of the PROFInet technology). An installation 10 is divided up into what are known as physical device objects P (also called PDev). PROFInet defines a runtime object model which each PROFInet device must implement. In this case each of the objects of the object module is usually realized by a COM object. In detail the objects are as follows: The Physical Device object P, which represents the device as a whole. It serves as an entry point for other devices, i.e. the first contact with a PROFInet device is made via this object. The Physical Device object P represents the physical properties of the component concerned. Precisely one instance of the physical device object P exists on each hardware component (e.g. PLC, drive, PC). The Logical Device object L (also known as LDev) represents the runtime environment in which the user program will be processed. The distinction between physical and logical device object P or L is generally unnecessary for embedded devices, but for runtime systems this distinction is however important since two soft PLCs can execute on one PC. The PC is in this case the physical device, the soft PLC is a logical device in each case. The logical device object L possesses interfaces for requesting the operating state, the time of day, collective and detailed diagnosis. What are known as runtime automation objects (also called RT-auto) represent the actual technological functionality of the device. The interfaces of the objects are thus dependent on the task which the object fulfills. An interface can contain both data (read and write) and also methods and events. The concrete properties of a PROFInet device are described by an XML file. This device description contains for the different objects of a PROFInet device its interfaces, the methods and data contained within them. Thus in particular the technical functionality of a device represented by the runtime automation object A can be described in the simplest manner. On the basis of the diagnosis hierarchy defined in the installation layout, a semantically similar diagnosis function is automatically generated for all elements of the hierarchy. The principle is illustrated below using PROFInet as an example. A generated diagnosis function of a Logical Device object L checks its own status when called. Depending on the result, the diagnosis function reports an error inclusive of description. At the level of the runtime automation object A the generated diagnosis function checks the status of the relevant object and calls the diagnosis function of the associated logical device object L. Depending on the values received, the diagnosis function where necessary forms an error message with description. At the lowest level of the diagnosis subsystem S, the generated diagnosis function of a subsystem S calls the diagnosis functions of the subordinate runtime automation object A. Thus purely logical subsystems S also possess a diagnosis function. This system is applied recursively up to the highest level 11, i.e. the diagnosis function of the diagnosis subsystem S is characterized so that it calls the diagnosis functions of the directly subordinate subsystems S in each case. As well as this propagation of diagnosis function calls from a higher level to the subordinate level of the diagnosis hierarchy in each case higher-value diagnosis functionality can be generated automatically in the sense of the induction by including the installation logic.

The layout of the installation, i.e. the topological arrangement of the components of the distributed automation system, is usually created in the planning phase of an installation. In this case a technology-driven hierarchical division of the overall installation into sub-installations, machines etc is undertaken (also known as sub-division into "subsystems"). It is assumed below that these technologically-based subsystems cover the same areas as the diagnosis subsystems. FIG. 2 illustrates the division of the overall installation into subsystems on the basis of the installation layout.

Figure 3:
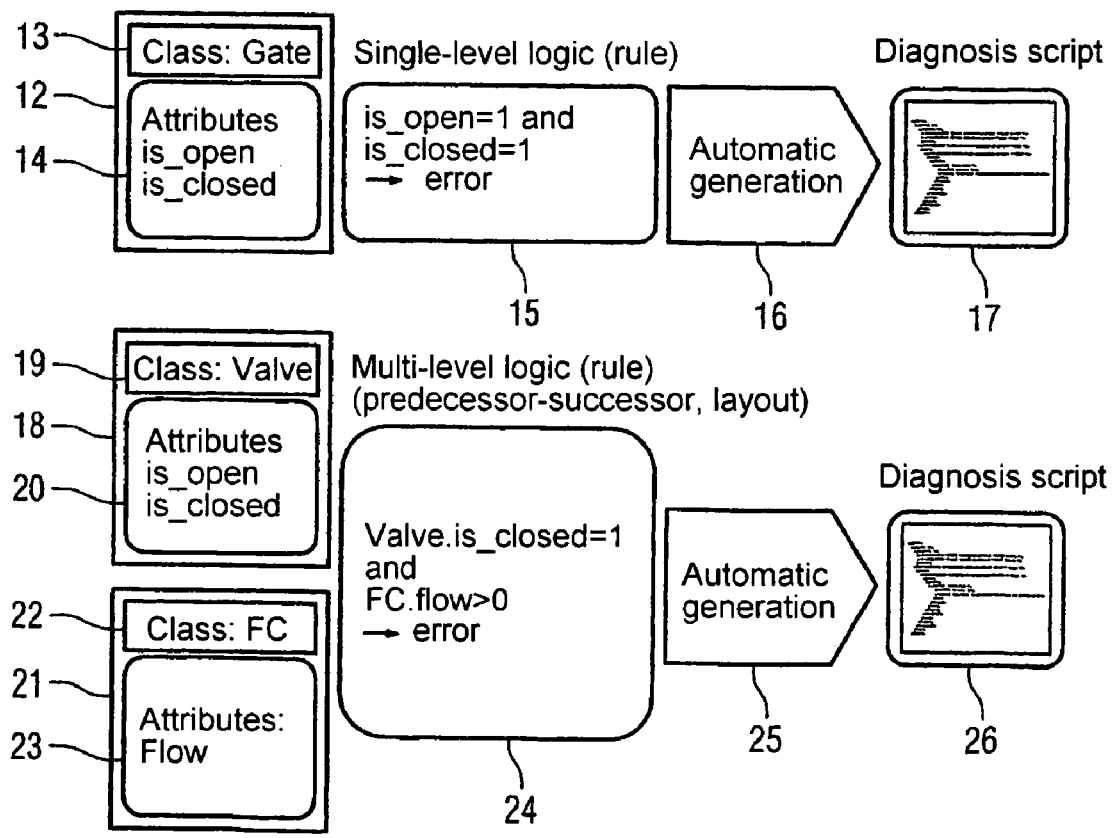
FIG. 3 the execution sequence for generating diagnosis information.

FIG. 3 shows the execution sequence of the generation of diagnosis information 17, 26. The applicable installation or system logic can be subdivided into two categories. Single-level logic maps the logic of precisely one element 12 of the diagnosis hierarchy. In this case internal information 14 of the element 12 is logically combined. Thus for example the logic of a subsystem of class 13 "gate" indicates that a system error is present if the gate (because of a defective sensor for example) reports "OPEN=1" and "CLOSED=1". This logical rule 15 will be converted in an automatic generation step 16 into an item of diagnosis Information 17, e.g. a diagnosis script.

So called Multi-level logic maps the logic of a subsystem building on the underlying elements 18 or 21 which it contains. If for example a subsystem contains an element 21 of the class 22 "flow meter" and a second element 18 of the class 19 "valve", there is a system error if the element 21 reports a "flow">0" while the second element 18 reports the position "closed". The characteristics of the elements 18, 21 are identified by the reference symbols 20 or 23. As in the examples, consistency rules (constraints) can be defined for both categories or can already be present as type attributes of the components or also of the subclasses used. These rules are generally already present as part of a component (e.g. as a facet) or diagnosis subsystem when the invention is applied (e.g. for re-use of the planning information of parts of older installations). For recursive generation of the diagnostic functions (those characterized as a script for example) the rules are then incorporated into the characterization of the diagnosis functions. In the case of single-level logic the defined roles are accepted directly into the diagnosis function, in FIG. 3 the diagnosis function 17. In the case of multi-level logic the rule to be used in the given case is determined on the basis of the installation layout, since multi-level logic arises from the interaction between different components.

FIG. 4 shows an example of diagnosis information which is executed as a diagnosis script function.

Figure 5:
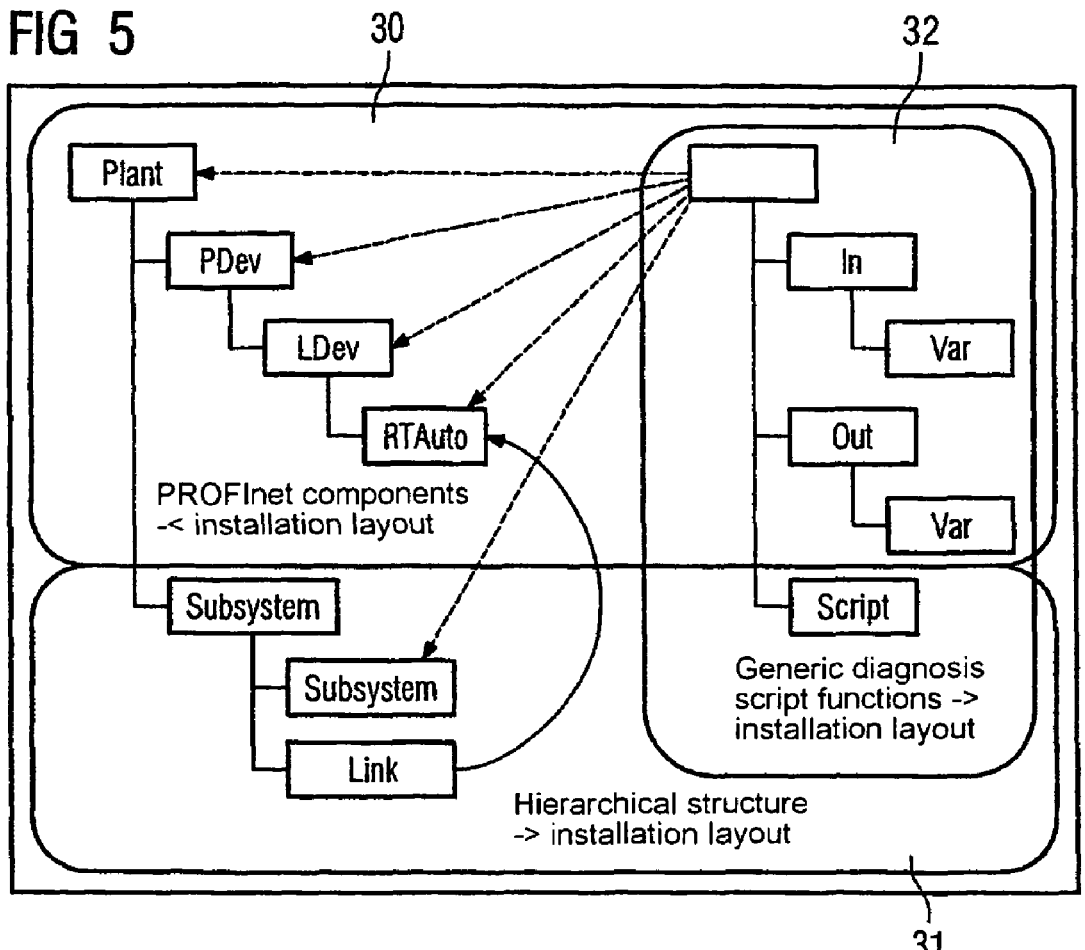
FIG. 5 information contained in the installation layout.

FIG. 5 shows the information included in the installation layout. In the exemplary embodiment in accordance with FIG. 5 information is included in the installation layout about PROFInet components 30, about the hierarchical structure 31 from the diagnosis viewpoint and about generic diagnosis functions 32.

The basis for the creation of single-level and multi-level logic is the definition of device classes (components and subsystems) with defined functions and properties. By using the inherent rules or rules building on them and by including the installation layout, diagnosis functionality can be derived and generated automatically as outlined above.

Figure 6:
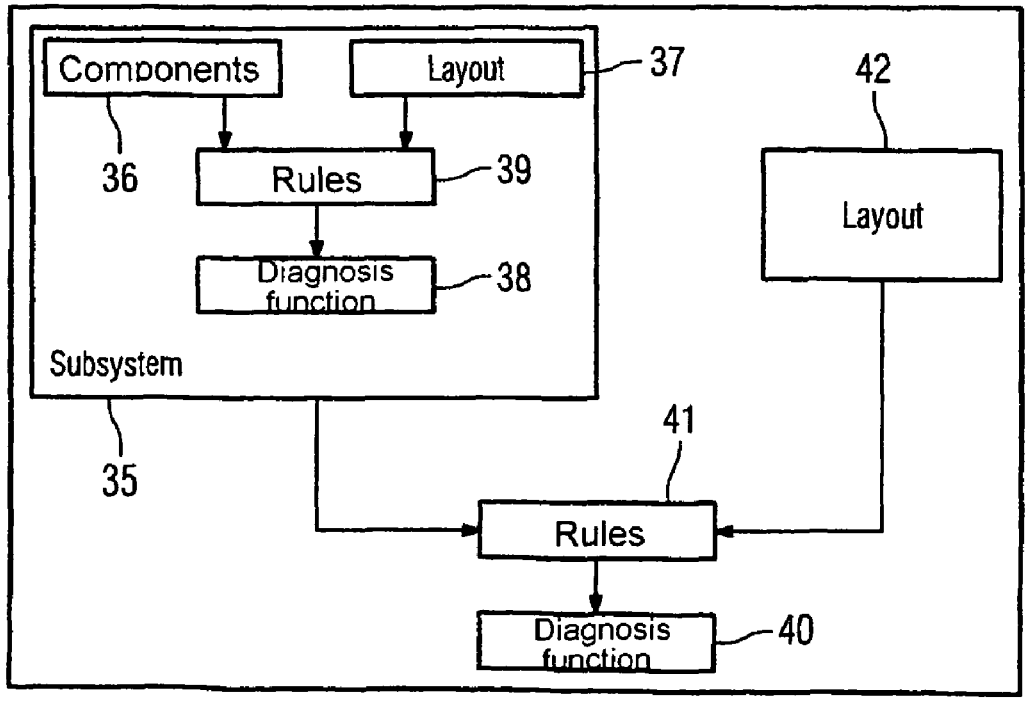
FIG. 6 the fractality of the diagnosis functionality.

FIG. 6 shows the fractality of the diagnosis functionality. The diagnosis hierarchy finally produced thus exhibits from the point of view of the installation the attribute of self-similarity (fractality). This means that all elements of the hierarchy have semantically the same self-similar diagnosis functionality 38, 40. This also includes subsystems 35, although these purely logical elements are not represented by any real automation component 36. In this case all the information needed for the automatic generation can be derived from the installation layout 37, 42. Individually these are the components used (e.g. PROFInet) 36, the collection of these components 36 into subsystems 35, and the further diagnosis hierarchy up to installation level. Information contained in the installation layout 37, 42 is used in such cases for generation of rules 39 or 41 for diagnosis of components 36 or subsystems 35, with the aid of diagnosis functions 38 or 40.

Figure 7:
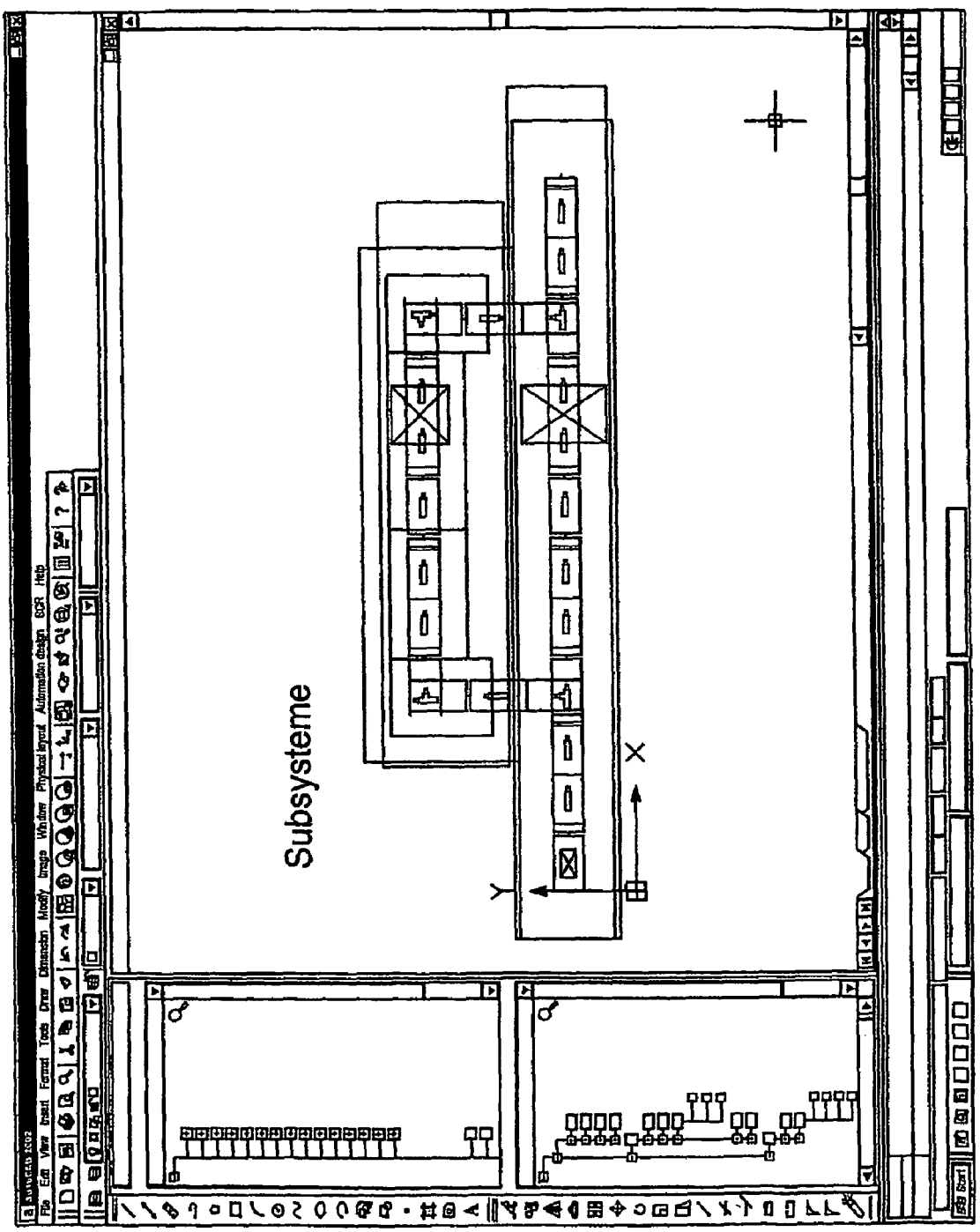
FIG. 7 the planning of an installation layout with a CAD system.

FIG. 7 shows the planning of the installation layout with a CAD system. Here a subsystem is defined either through the definition of the tree-type installation structure (node is a subsystem, leaves are system components or again subsystem nodes) or through aggregation. With a CAD system usually used for planning of an installation layout subsystems can be defined for diagnosis by marking the components belonging to a subsystem. In FIG. 6 the components belonging to a subsystem are defined for example by drawing a polygon (lasso) which encloses the components. In this case a polygon can entirely enclose further polygons. These embedded polygons then correspond to the visual definition of subordinate diagnosis subsystems.

Figure 8:
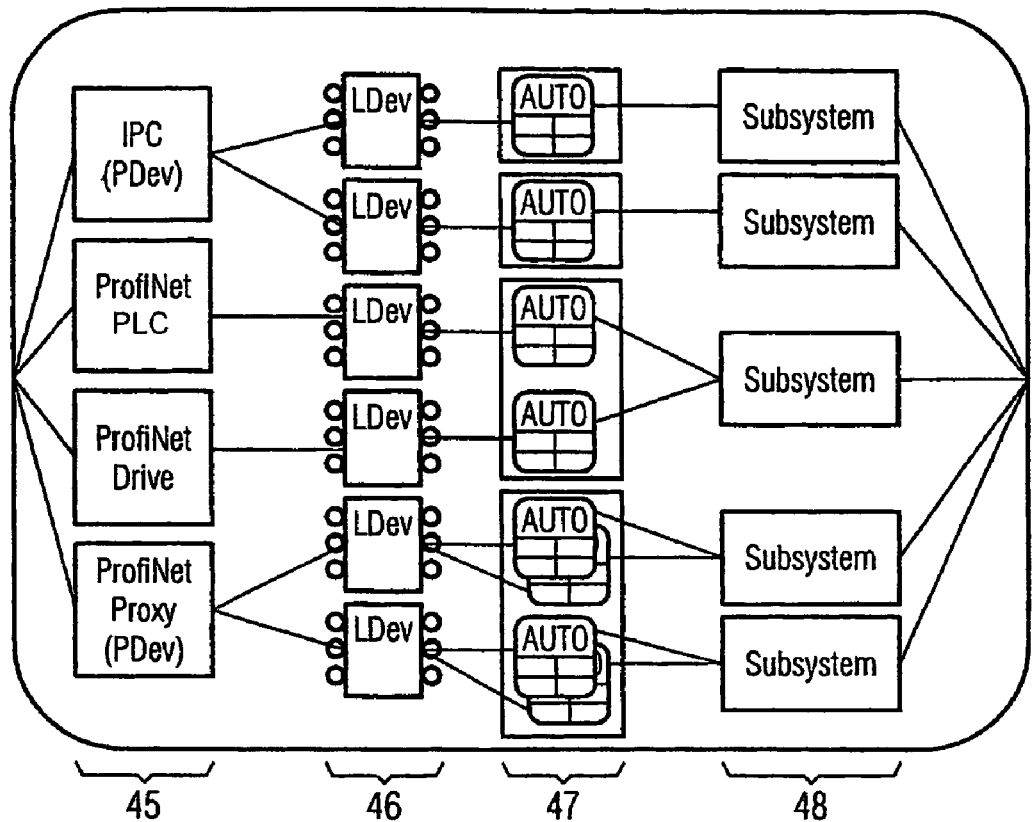
FIG. 8 a diagnosis network from the installation layout.
Figure 9:
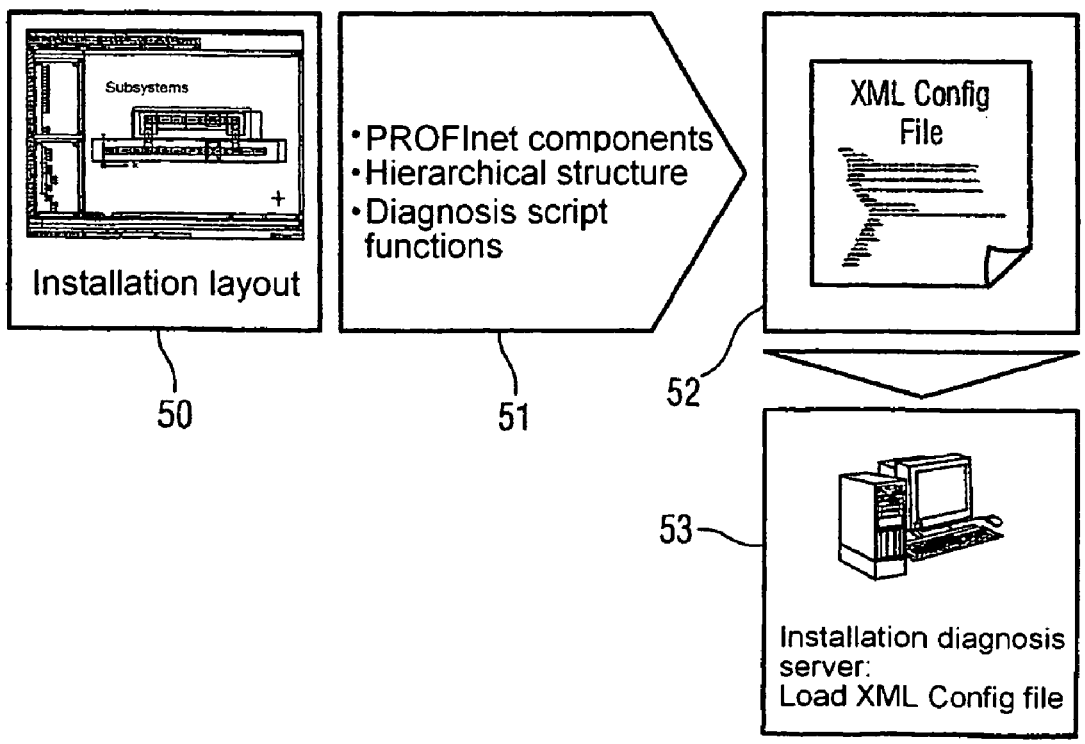
FIG. 9 the engineering workflow.

FIG. 8 shows a diagnosis network created from the installation layout The installation layout already includes all the information needed for the further steps of the generation of a system for provision of diagnosis information, such as the assignment of runtime automation objects 47 to components 45 and thereby to subsystems 48. The components handled in the planning phase possess a diagnosis view as well as a topological view (position in the installation, dimensions, form, etc.). The connection of the diagnosis view of the components with the hierarchy enables the diagnosis functionality to be generated automatically as described above. Building on the diagnosis view of the components, diagnosis functions for the enclosing subsystems included can be generated in a first step. From this in the second step diagnosis functions for further subsystems right up to installation level are generated recursively. In the generated diagnosis functions the constraints already present for the relevant hierarchy levels (e.g. as a class attribute of a component) or those specified explicitly are included for the single-level or multi-level logic FIG. 9 shows the engineering workflow for generating a system for the supply of diagnosis information. Staring from an installation layout 50, an XML configuration file 52 is created automatically in a step identified by reference symbol 51. This XML document contains the information contained in the installation layout 50 about the PROF Inet components used, the hierarchical structure (subsystems) as well as the automatically generated diagnosis functions in the form of script functions. The XML Config File 52 is for example loaded and processed by an installation diagnosis server 53. The installation diagnosis server 53 is then in a position to execute all diagnosis script functions and thereby to diagnose the installation, subsystems and components.

Figure 10:
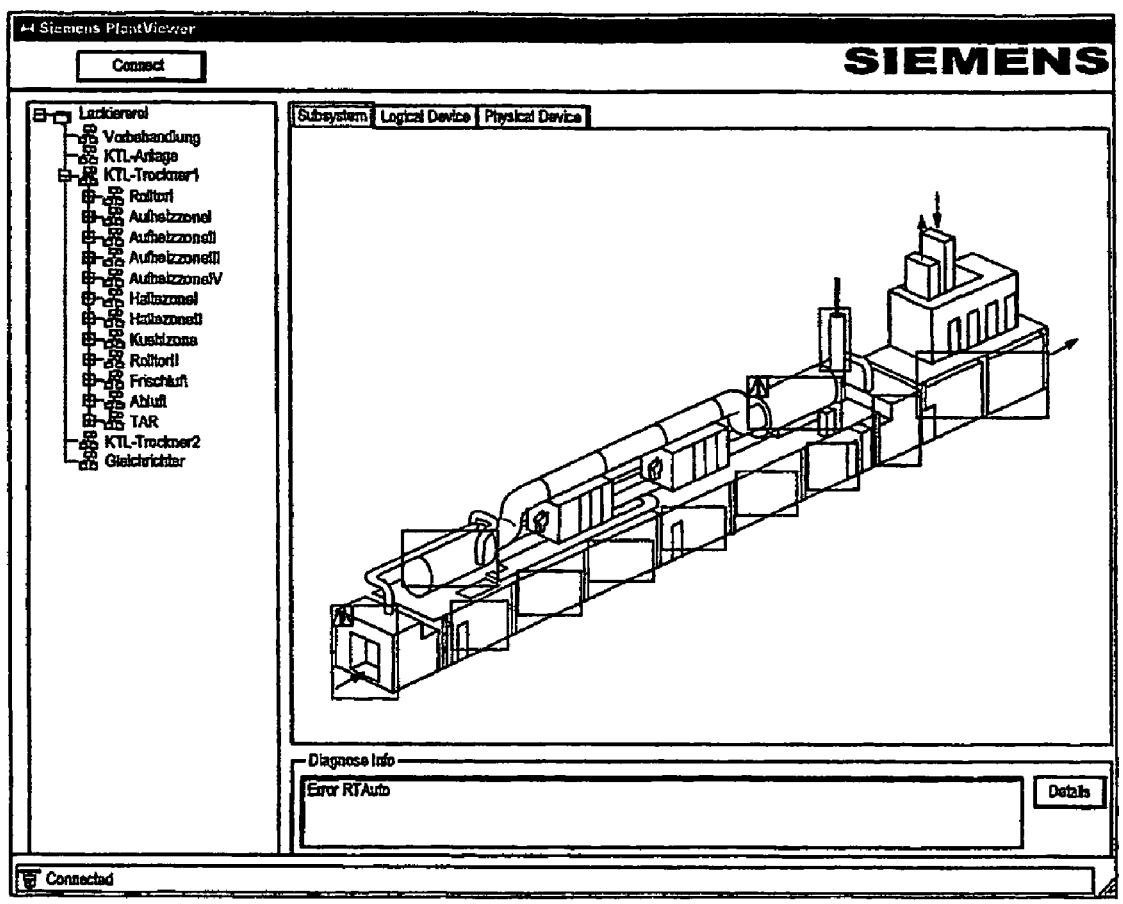
FIG. 10 the visualization of diagnosis information.

FIG. 10 shows a prototypical visualization which builds on an installation diagnosis server. The visualization shown is based on a concept which combines graphics components with the diagnosis subsystems and thereby makes it possible to show faults of a subsystem in the installation graphics. The implementation consists of the installation diagnosis server and a client application for visualization purposes. The communication between client and server is undertaken by means of Web services and is based on the HTTP protocol. Both server and client can be used in a plurality of different installations without modifications being required since the server is initialized by means of the XML document containing the necessary information.

The approach described here it not only provides the opportunity of automatic generation of the diagnosis functionality and thus of a significant reduction in the engineering effort required, but also the advantage of an end-to-end diagnosis concept. The end-to-end diagnosis concept is not restricted in this case to component diagnoses but, by forming subsystems with diagnoses functionality, reduces the complexity of the installation as a whole, especially for the installation operators.

The combination of the installation topology with the rule-based diagnosis hierarchy of the subsystems derived from it can also been used to derive a diagnosis interface in accordance with FIG. 10 directly. The faulty components and the subsystems enclosing them in the layout can for example be highlighted by marking them in color. This can also be done accordingly in the tree presentation, for example recursively, beginning with the faulty components and moving upwards to the installation node. By directly selecting the component marked as faulty in the layout by clicking on it with the mouse, comprehensive component-related diagnosis information can be called up.

One possible option for executing the automatically generated diagnosis functions is the generation of script functions. These script functions can for example be executed in a so-called installation diagnosis server and process the diagnosis functions. In principal this concept can also be realized decentrally, for example in a subsystem diagnosis server which resides in a PDev. This concept additionally guarantees that the approach of automatic generation of an installation diagnosis system can also be integrated without any adverse effects in existing installations.

In summary the invention thus relates to a method for generating a system for provision diagnosis information 1, 2, 3 as well as to a corresponding system. To simplify the supply of information for diagnosis of technical installations or technical processes it is proposed that the components 4 of an automation system 5 which have diagnosis interfaces for supply of diagnosis information 1 for diagnosis of the relevant component 4 are collected into at least one group 6 and that the supply of diagnosis information 2 of the relevant group 6 is provided by combining the diagnosis information 1 of the components 4 collected in the relevant group 6.

Information about the technical background of the invention is given below based on technical articles published by Georg H. Biehler, Wolfram Gierling, "Das Engineering-Modell" (the engineering model) and Joachim Feld, Ronald Lange, Norbert Bechstein, "Das Laufzeit-Modell" (the runtime model).

The Profibus user organization presented the communication, automation and engineering model PROFInet in August 2000. The coalescence of industrial automation and the IT of the higher corporate levels and the global networking of corporations at all levels of the Internet is the decisive factor in the known Profibus technology having been expanded vertically. An end-to-end concept for the vertical data integration was created under the term PROFInet. In this case, for reasons of consistency with higher levels of an automation system, the communication means Ethernet is employed. with full compatibility to conventional Profibus technology being retained. The PROFInet concept comprises three aspects: For the project planning of PROFInet systems a non-proprietary engineering concept was defined. It is based on an engineering object model with which not only project planning tools can be developed which can use the components of different manufacturers but with which proprietary or user-specific functional expansions can be defined by means of so-called facets. Thus, by the clear separation between the proprietary programming of the individual devices and the installation-wide connection to a higher-ranking engineering tool, known as the connection editor, products from different manufacturers can be integrated into an installation. Furthermore PROFInet specifies an open object-oriented runtime concept. The runtime concept defines the widely used mechanisms from the Ethernet sector such as TCP(UDP)/IP as a basis for communication. DCOM mechanisms are accommodated above the basic mechanisms. Alternatively for application areas with strict real time, a communication mechanism optimized for this purpose is available. The PROFInet components are mapped in the form of objects for which the communication is guaranteed by the mechanisms of the object protocol. The projected connections are ensured by the creation of the communication relationships and the exchange of data between PROFInet subscribers. In the term PROFInet covers a uniform object-based architecture concept for distributed automation systems from the I/O level to the control level, which integrates systems which follow the conventional Profibus technology seamlessly into the overall system. The Profibus system and other field bus systems are integrated into a PROFInet-system by means of proxies. A proxy is a software module that implements by proxy the functionality of automation objects both for the subscribers on the Profibus and also in relation to the other PROFInet subscribers on the Ethernet.

Through the specification of the three aspects named above allows PROFInet to cover all lifecycle phases of a distributed automation system. The topic of engineering is that aspect of PROFInet which has the greatest points of contact to the users of the technology. This applies equally to the system designers and also the installation operators. It is also that aspect of PROFInet which involves the greatest cost transparency potential for the setting-up and the operation of installations, since the costs at product level have been on a downward trend for many years now and the potential may well be largely exhausted. The simplification of the handling with the system played a significant role in the specification of PROFInet. In this connection the engineering tools have an important part to play. Only with their help can the costs for the installation builders and operators be significantly reduced. And in actual fact the engineering of an automation solution with PROFInet is a simple matter from the user's standpoint. However the more user friendly a system is for the users, the more complex it is under the surface. The engineering tool can be expanded dynamically so that components from any manufacturers can interoperate smoothly in an engineering tool. The widest variety of engineering aspects such as connection, parameterization, test, commissioning and diagnosis are to be made available. Existing (proprietary) programming and engineering tools must be able to continue to be used. Existing concepts such as OLE for Process Control (OPC) and Fieldbus Device Tool (FDT) are to be integrated. PROFInet should be able to interact with other DP methods in the company as a whole. These include for example Management Information (MIS) systems and Enterprise Resource Planning (ERP) systems. It must also be possible without special tools to copy data into the PROFInet engineering model or to transfer it from the system into other applications such as to Excel for example. Existing field buses, especially Profibus-DP must be able to be linked in.

Before the characteristics of the engineering concept are mentioned it is important to present the underlying models. The openness of the system required in many aspects requires an end-to-end concept which takes account of these requirements. Thus PROFInet is based on an object-oriented approach—the Component Object Model (COM) of Microsoft. In this case self-contained modules are created of which the external functionality can be reached via unique interfaces, the interfaces of the object. An interface is the collection of a specific set of functions by which the service which is to be performed by a server for a client is defined. In this case one speaks of a component implementing the interface. The type of implementation itself is not however prescribed for the creator of the component Script languages such as Visual Basic for Applications (VBA) can access PROFInet objects via the OLE automation interfaces also standardized by COM. This means that the user has an especially simple option for adapting the functional scope of the PROFInet engineering tool through their own expansions to suit their requirements.

A PROFInet automation solution consists at run time of automation objects communicating with each other, the runtime automation objects, abbreviated to RT-Autos. These are software components which run on the physical PROFInet devices. The interaction of the RT-Autos must be specified with the aid of the project planning tool. For this purpose the RT-Autos have counterparts in the project planning tool which contain all necessary information for complete project planning: The engineering system automation objects (ES-Autos). On compilation and loading of application a corresponding RT-Auto is generated from each ES-Auto. So that the project planning tool knows on which device an automation object lies it has a counterpart of the object in the shape of what is known as an Engineering System Device (ES-Device). To put it precisely the ES-Device corresponds to a "logical device". In addition there is an assignment between "logical" and "physical" devices. Mostly there is a "1:1" assignment here, which means: There is precisely one firmware for one hardware (physical device). It is however also possible for a number of independent software packages to run on an item of hardware. Examples of this are especially devices with free computing power: A PC with Slot-PLC or a Windows-CE device with user interface and PLC-Component. The term Engineering System Object (ES object) is used as a generic term for all objects in the context of the project planning tool. It includes everything that the user takes into account during project planning and everything with which he is involved. It is also the "basic class" for the engineering objects. Through the instantiation, connection and parameterization of the ES objects the model of the automation solution of a concrete installation is produced. Initiated by a download, the runtime software is created by evaluating the engineering model. The PROFInet specification describes an object model which defines the technical framework conditions for use of ES objects. PROFInet-conformant engineering systems can then be realized on this basis. On the other hand not every manufacturer of PROFInet devices is forced to develop their own project planning tool and thereby to keep reinventing the wheel.

An important concept for expanding the PROFInet object model is represented by the facets. A facet implements a quite specific (part) functional scope of the ES and presents itself to the user as a special view of the object. Thus the connection facet merely considers the communication relationships of the object to other objects. For the parameterization of the object the user switches to the parameterization facet. The assignment of an automation object to a physical device is realized with the aid of the device assignment facet. Finally the connection information is downloaded onto a devices using the download facet. A number of facets are defined by the PROFInet standard. Other facets are application-specific. Each component manufacturer who implements automation objects can de fine their own types of facets. The PROFInet standard ensures these are able to be inserted into the ES object. Diagnosis facets which present the specific diagnosis information of the device in the optimum way might be mentioned as an example of these types of facets. The method which determines compatible devices for a specific automation object is implemented in the device assignment facet. This has the advantage of only allowing the project planning tool to display those devices on which the selected automation object can also be run. For devices with fixed functionality on the other hand the user can first select the device, after which the project planning tool merely displays those RT-Autos which are available on this device.

The PROFInet specification discloses the interface descriptions of a project planning tool, with each manufacturer being able to create their own PROFInet-conformant project planning tool. Since this tool does not however contain any proprietary implementations it is possible at any time to use the tool of another manufacturer. Proprietary parts link the engineering tool in via defined interfaces. In accordance with the basic idea of COM programming, no implementations are prescribed but only unique interfaces defined. The PROFInet strategy then ensures that the communication functions smoothly over the bus, but on the other hand gives the manufacturers every freedom to differentiate themselves from the competition by their own implementations. The advantages of PROFInet can be seen especially in engineering. The fact that communication no longer has to be programmed but can be planned into the project simplifies the creation of an automation solution significantly. The re-use of tested solutions shortens development and commissioning times and can thereby contribute to a significant cost reduction.

PROFInet is an end-to-end concept for vertical data integration, with Profibus-specific communication mechanisms deliberately being dispensed with and instead open standards having been adopted to enable Fieldbus-independent communication. The PROFInet concept defines an object model for the engineering system which is implemented with the COM component technology from Microsoft. The actual relationship of different components is described by XML (extensible Markup Language). The seven layers of the ISO/OSI reference model must be defined for the runtime system. For peer-to-peer communication between autonomous functional units Ethernet with the TCP/IP protocol suite up to layer 4 is the obvious choice. This can be understood as protocols such as TCP, UDP or ICMP which represent undisputed de-facto standards in the IT landscape. But how is Layer 7 created? In the PROFInet concept components ("objects") are formed which are only accessible from outside via their interfaces. An interface is the collection of a specific set of functions, and thereby a type of contract. It defines which service is to be provided by a server for a client. In this case one speaks of a component implementing the interface. The type of implementation itself is however not prescribed for the creator of an object. It is thus obvious to also use an object protocol for communication between the objects at run time.

PROFInet uses Microsoft DCOM (Distributed COM) in these points. DCOM is the extension of the COM technology for distributed applications. It is based on the DCE RPC (Distributed Computing Environment Remote Procedure Call) standard. One of the most important advantages of DCOM lies in the fact that the same component technology can be used for engineering and for runtime. DCOM has previously primarily been implemented on PC architectures. In the embedded area it is not necessary to implement the entire DCOM such as within Microsoft Windows. It is sufficient to implement those parts which will be visible in the network via the so-called DCOM Wire Protocol and were published as an Internet Draft. Within embedded devices the programming can remain unchanged. In particular a strict COM architecture does not have to be implemented. All implementation parts of the automation objects as COM objects with the corresponding interfaces are allowed, provided the PROFInet object impression remains preserved to the outside world. For example for a controller the objects are created in the language necessary for this controller and are run as modules.

As in engineering however in runtime mode as well the syntax is defined by the (D)COM technology, but the specific expansions for the automation technology do not however have to be defined (semantics). To this end the interfaces of the automation objects can be divided up into four categories in PROFInet depending on the functionality which they cover:

Mandatory interfaces: These interfaces define a standard which all resources (devices) of a PROFInet-based automation solution must implement. As well as the interfaces defined by COM—such as those of identification—the support of data and event connection is part of mandatory functionality.

Optional interfaces: These are options which not every device must provide If this function is to be provided however the interface implementation is mandatory by default.

Device-specific interfaces: These of the interfaces which make access to device-specific services possible. These interfaces cannot be standardized and as a rule are implemented in the firmware. The objects which implement the device-specific interfaces form the device object model.

Application-specific interfaces: Here the application-specific automation objects needed are developed with programming tools which under some circumstances are target system-specific.

PROFInet defines a runtime object model which each PROFInet device which is operated on the Ethernet must implement. Each of the available objects is realized by a DCOM object. Individually these are as follows:

The Physical Device object (PDev): It represents the device as a whole. It serves as the entry point for other devices, meaning the first contact with a PROFInet device is made via this object. The PDev expresses the physical attributes of the component. Exactly one instance of the PDev exists on each hardware component (PLC, drive, PC).

The Logical Device Object (LDev): It represents the actual program medium, meaning the parts of the device which represent the actual PROFInet nodes. Although the distinction between physical and logical device is in general unnecessary with embedded devices, this distinction is important however for runtime systems on a PC since two soft-PLCs can executed on a PC. The PC is in this case the physical device, the soft-PLC a logical device in each case. The logical device possesses interfaces for requesting the operating state, the time of day, collective and detailed diagnosis.

Runtime automation objects (RT-Auto): They represent the actual technological functionality of the device. The interfaces of the objects are thus dependent on the task which the object fulfills. So for example a lifting platform has an interface to move the platform. An interface can in this case contain both data (read, write) and also methods and events.

The proxies of LDev or RT-Auto respectively in the engineering are the ES-Device and the ES-Auto respectively described above. The most important object for the interaction with other PROFInet devices is the ACCO (Active Control Connection Object). This object is used for the planned establishment of communication relationships between objects. The ACCO implements a consumer-provider model. The elements of the interface of the RT-Autos are made available to other devices via the ACCO (provider). The ACCO however also registers with ACCOs of other devices and supplies the RT-Autos of its device with data or events (consumer). Communication relationships are always established from the communications side. A data or event connection between two objects (such as for example two consecutive conveyor elements) can be simply specified by project planning of the connection on the consumer side. The ACCO then automatically takes care of establishing the communication relationship and the exchange of the data. An important aspect of the ACCO is error handling. This comprises the transmission of quality code and time stamp with the values as well as the automatic provision of a planned replacement value in the event of an error. Also the monitoring of the communication partner, the reconnect after loss of a connection as well as the diagnosis and test options for connect ions. The transmission with DCOM is event-controlled, which means that the provider monitors its data for change. The subordinate layers look after securing the connection.

The invention claimed is:

1. A method of providing diagnosis information and carrying out a process diagnosis therewith in an automation system, comprising:
   providing a plurality of components to the automation system, at least some of the components comprising a diagnosis interface for transmitting diagnosis information related to the respective component;
   forming at least one component group including at least some of the components;
   interrelating the diagnosis information of the at least some of the components to form group diagnosis information; and
   providing the group diagnosis information,
   wherein the components and the component groups are assigned to classes, each class defining functions and attributes of the assigned components or component groups,
   wherein the diagnosis information includes rules for logically combining input variables and for providing at least one output variable based on the combined input variables, wherein a single-level logic maps logic of one component of the diagnosis hierarchy and a multi-level logic maps logic of the component group, the single-level logic logically combining internal information of the component, and
   wherein the classes are a basis for creation of the single-level logic and multi-level logic.

2. The method in accordance with claim 1, further comprising:
   forming a higher-ranking group by assigning at least one of the component groups and/or individual components to the higher-ranking group; and
   interrelating the group diagnosis information of the assigned component groups and/or the diagnosis information of the assigned individual components to form a higher-ranking group diagnosis information.

3. The method in accordance with claim 1, wherein the components are part of an installation layout, and the group diagnosis information is formed based on the installation layout.

4. The method in accordance with claim 3, wherein the installation layout includes tasks and a networking plan of the components.

5. The method in accordance with claim 3, wherein the installation layout includes a definition of which component groups and/or which individual components are part of a higher-ranking group.

6. The method in accordance with claim 1, wherein the diagnosis information of each component included in the part of the components has the same semantic structure.

7. A system for providing diagnosis information of an automation system, wherein
   the automation system has a plurality of components,
   at least a part of the components each comprises a diagnosis interface for transmitting diagnosis information related to the respective component,
   at least one component group including the part of the components is formed, the system comprising a computing unit configured to interrelate the diagnosis information of the part of the components to form a group diagnosis information,
   the components and the component groups are assigned to classes, each class defining functions and attributes of the assigned components or component groups,
   the diagnosis information includes rules for logically combining input variables and for providing at least one output variable based on the combined input variables, wherein a single-level logic maps logic of one component of the diagnosis hierarchy and a multi-level logic maps logic of the component group, the single-level logic logically combining internal information of the component, and
   the classes are a basis for creation of the single-level logic and multi-level logic.

8. The system in accordance with claim 7, wherein a higher-ranking group is formed by assigning at least one of the component groups and/or individual components to the higher-ranking group, and the computing unit is further configured to interrelate the group diagnosis information of the assigned component groups and/or the diagnosis information of the assigned individual components to form a higher-ranking group diagnosis information.

9. The system in accordance with claim 7, wherein the components are part of an installation layout, and the group diagnosis information is formed based on the installation layout.

10. The system in accordance with claim 9, wherein the installation layout includes tasks and a networking plan of the components.

11. The system in accordance with claim 9, wherein the installation layout includes a definition of which component groups and/or which individual components are part of a higher-ranking group.

12. The system in accordance with claim 9, further comprising a display device for visualizing the diagnosis information based on the installation layout.

13. The system in accordance with claim 7, wherein the diagnosis information of each component included in the part of the components has the same semantic structure.

* * * * *